(12) United States Patent
Conger et al.

(10) Patent No.: US 6,370,756 B1
(45) Date of Patent: Apr. 16, 2002

(54) METHOD OF FORMING DAMPED DRIVE SHAFTS

(75) Inventors: Gary A. Conger, Hemlock; Donald S. Agnew, Saginaw, both of MI (US)

(73) Assignee: Caraustar Industrial & Consumer Products Group, Warrensville Heights, OH (US)

( * ) Notice: Subject to any disclaimer, the term of this patent is extended or adjusted under 35 U.S.C. 154(b) by 0 days.

(21) Appl. No.: 09/572,767

(22) Filed: May 17, 2000

(51) Int. Cl.[7] .................................................. B23P 17/00
(52) U.S. Cl. ............................ 29/423; 138/89; 464/180
(58) Field of Search ............................ 464/180; 29/423, 29/516, 890.08; 138/89, 109

(56) References Cited

U.S. PATENT DOCUMENTS

| | | |
|---|---|---|
| 1,895,827 A | 1/1933 | Van Hecke |
| 2,493,452 A | 1/1950 | Grigg |
| 2,924,246 A | 2/1960 | Markel |
| 3,704,729 A | 12/1972 | Tomlinson |
| 3,910,191 A | 10/1975 | Williams |
| 3,983,904 A | 10/1976 | Laviano |
| 4,014,184 A * | 3/1977 | Stark |
| 4,503,880 A | 3/1985 | Hochman |
| 4,762,152 A | 8/1988 | Clausen |
| 4,964,438 A | 10/1990 | Welty |
| 4,968,197 A | 11/1990 | Chen |
| 5,033,510 A | 7/1991 | Huber |
| 5,461,777 A * | 10/1995 | Ikeda et all. ............. 29/890.08 |
| 5,560,396 A | 10/1996 | Kramer, Jr. |
| 5,643,093 A * | 7/1997 | Breese |
| 5,816,292 A | 10/1998 | Wilson et al. |
| 5,868,627 A | 2/1999 | Stark et al. |
| 5,976,021 A * | 11/1999 | Stark et al. |
| 6,254,488 B1 * | 3/2001 | Hill |

* cited by examiner

*Primary Examiner*—S. Thomas Hughes
*Assistant Examiner*—Steven A Blount
(74) *Attorney, Agent, or Firm*—Resiing, Ethington, Barnes, Kisselle, Learman & McCulloch, P.C.

(57) ABSTRACT

A damped drive shaft is produced by forming a cylindrical tube of selected length and diameter, inserting a damper into the tube and positioning it at a central location within the tube, fitting a deformable plug into each end of the tube, and swaging the ends of the tube to reduce their diameter and deform the plugs to effect a seal at the opposite ends of the tube. Following the swaging operation the reduced diameter ends of the tube may be faced and washed. Thereafter, the plugs may be removed whereupon the drive shaft is ready for further processing.

14 Claims, 4 Drawing Sheets

METHOD OF FORMING DAMPED DRIVE SHAFTS

This invention relates to a method of forming a damped drive shaft of the kind adapted to transmit driving torque from a vehicle transmission to the driving wheels. More particularly the invention relates to such a shaft. whose ends are radially contracted.

BACKGROUND OF THE INVENTION

In those instances in which a vehicle has a tubular drive shaft which couples the transmission to its driving wheels it is not uncommon for rotation of the shaft to produce objectionable vibrations and noise. These undesirable characteristics may be reduced by fitting a damper into the shaft. The damper, however, must be of such diameter and construction that, once it occupies a selected position in the shaft it will remain in such position thereby avoiding unbalancing the shaft because of movement of the damper relative to the shaft. The fitting of a damper to a drive shaft presents special problems in those instances in which the drive shaft has a larger diameter between its ends than at its ends. However, the use of reduced diameter end drive shafts is preferred in many instances.

Obviously, if a damper is to be assembled in a shaft whose ends are of smaller diameter than the remainder of the shaft, and if the damper is to remain fixed in a selected position within the shaft, problems are encountered in inserting the damper into the shaft through the reduced diameter at one end of the shaft. One manner of overcoming these problems is disclosed in U.S. Pat. No. 5,868,627.

It also is possible to insert a damper into a shaft before the ends are contracted and thereafter reduce the diameter of the ends of the shaft by a swaging operation. In this instance it is necessary to wash the ends of the shaft so as to remove the swaging compound. If the damper is made of paperboard or other hygroscopic material, care must be taken to ensure that the washing of the shaft does not impair the integrity of the damper. One manner of achieving this result is disclosed in U.S. Pat. No. 5,976,021.

Although the constructions and methods disclosed in the aforementioned patents enable satisfactory results to be obtained, it is desirable to minimize manufacturing complexities and assembly operations. A damped shaft formed in accordance with this invention enables this result to be achieved.

SUMMARY OF THE INVENTION

A damped shaft is formed according to a preferred embodiment of the invention from a metal tube of suitable length and of substantially uniform diameter from end to end. Before either end of the tube is contracted radially, a cylindrical damper of appropriate diameter is inserted into the tube and located in a position inwardly of both ends of the tube. Thereafter, a plug formed of deformable material is fitted into each end of the tube. Each plug has an undeformed size or diameter corresponding substantially to the diameter of the tube. The plugs are so positioned in the tube that they do not engage the damper, but instead are axially spaced therefrom.

Following the insertion of the plugs into the opposite ends of the tube-the ends are radially contracted by a swaging operation. As the ends of the tube contract, they radially contract the plugs, thereby enabling the plugs to seal the tube at its opposite ends.

Following the swaging operation the ends of the tube may be finished by a facing or chamfering operation and washed. Since the plugs seal the ends of the tube neither the washing liquid nor chips from the finishing operation may reach the damper.

Each of the plugs has a rod which extends axially of the plug and terminates at one end in an eye through which a hook may extend to enable the plug to be extracted from the associated end of the tube.

Following removal of the plugs, the shaft may be balanced.

THE DRAWINGS

The method of forming a damped drive shaft according to the invention is disclosed in the accompanying drawings wherein.

THE PREFERRED EMBODIMENT

Figure 1:
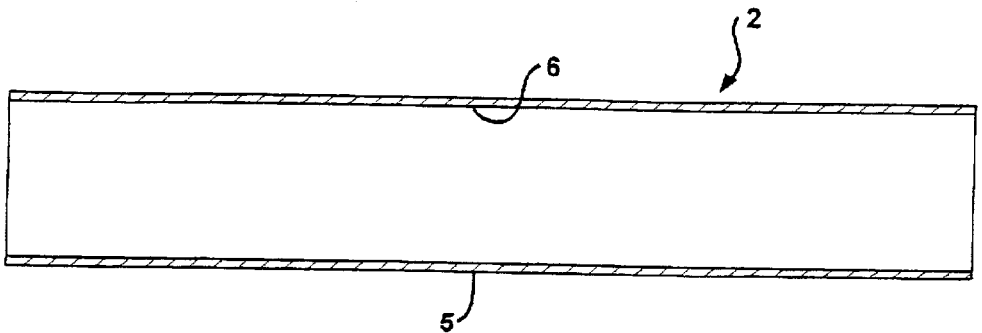
FIG. 1 is a sectional view of a tube that is to be formed into a drive shaft.
Figure 2:
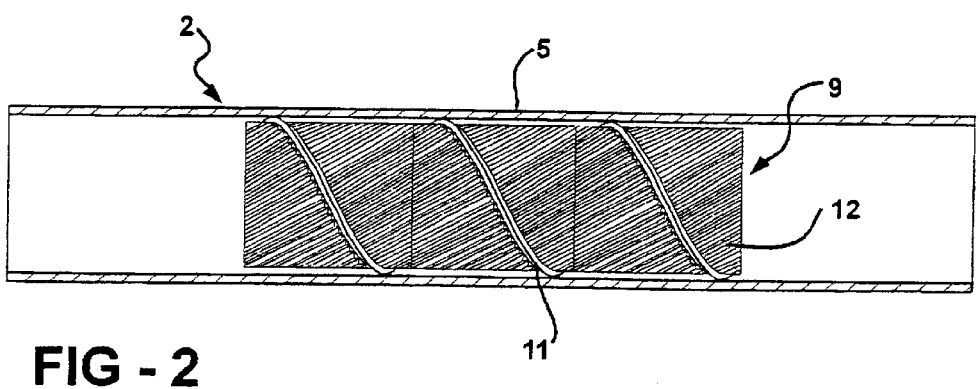
FIG. 2 is a view similar to FIG. 1, but illustrating a damper accommodated in the tube and spaced inwardly from the ends thereof.
Figure 3:
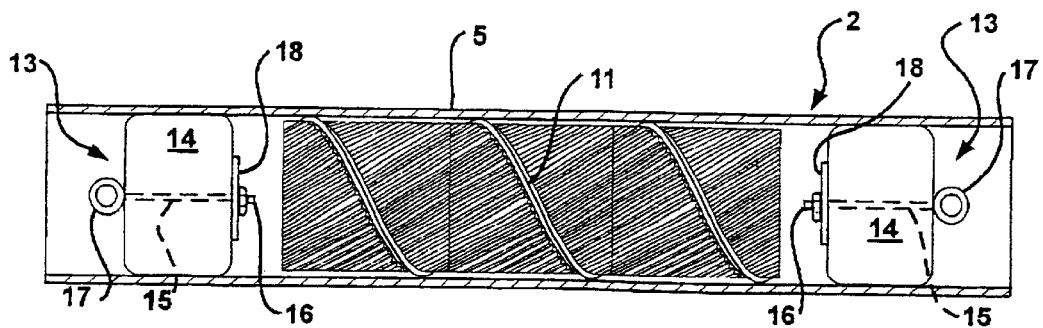
FIG. 3 is a view similar to FIG. 2, but illustrating one form of plug fitted into the tube at each end of the latter.
Figure 4:
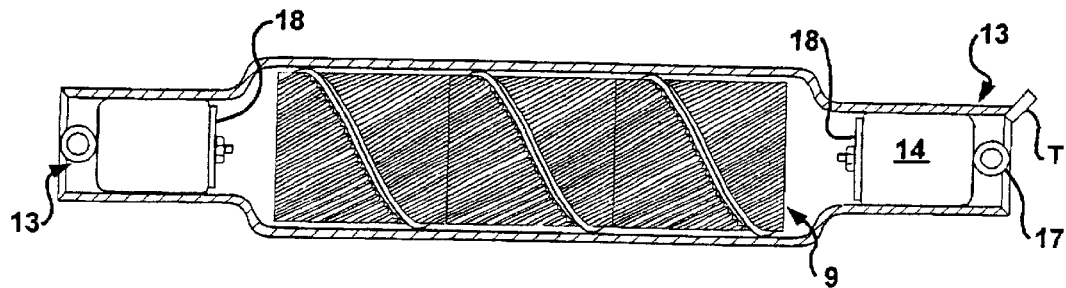
FIG. 4 is a view showing the tube and the plugs contracted radially as a result of a swaging operation.
Figure 5:
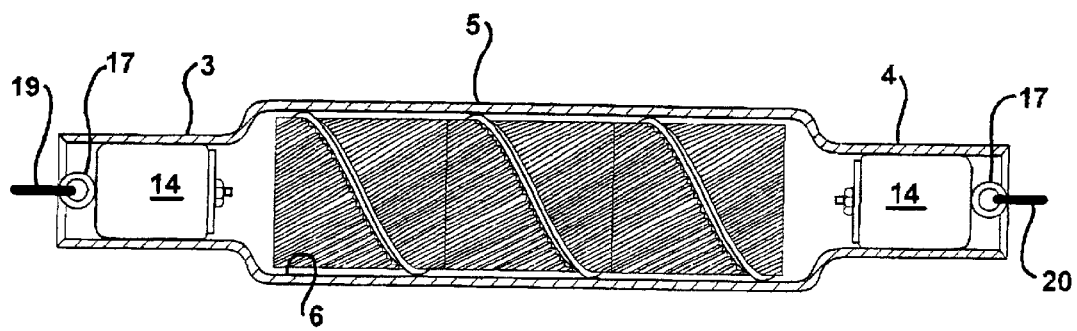
FIG. 5 is a view similar to FIG. 4, but illustrating removal of the plugs from the ends of the tube.
Figure 6:
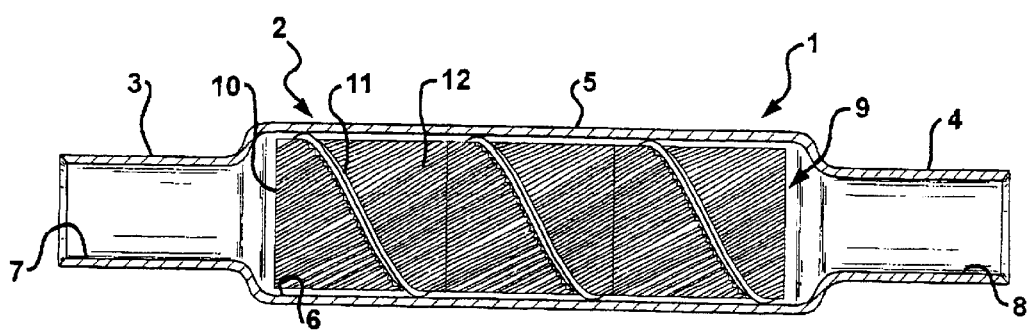
FIG. 6 is a sectional view of a damped shaft produced according to the invention.
Figure 7:
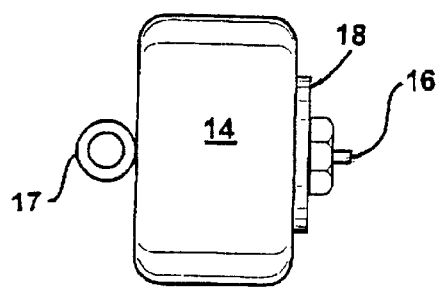
FIG. 7 is an elevational view of the plug shown in FIGS. 3–5.

A damped drive shaft produced in accordance with the invention is designated in FIG. 6 by the reference character 1 and comprises a hollow tube 2 having reduced diameter ends 3 and 4 extending in opposite directions from a central section 5 having a bore 6 of substantially uniform diameter. The reduced diameter ends 3 and 4 also have bores 7 and 8, respectively, and such bores are of corresponding diameter and coaxial with one another and with the bore 6.

Within the bore 6 of the central tubular section 5 is a cylindrical damper 9 of known construction, such as that disclosed in U.S. Pat. No. 4,909,361. The damper has a substantially rigid, hollow, cylindrical core 10 formed of a suitable number of plies of helically wound paperboard or other suitable material which normally is not waterproof. The core has secured thereto a helically wound, external retaining strip 11 flanked by a corrugated paperboard winding 12. The strip 11 extends radially beyond the periphery of the core 10 a distance sufficient to enable it to bear upon the surface of the bore 6 of the central section 5 when the damper is accommodated within the latter.

Although one form of damper has been disclosed, other kinds of dampers may be used.

As shown in FIG. 6, the opposite ends of the shaft 1 are free of any openings or attachments, but it is contemplated that the ends will be treated in such manner as to accommodate universal joints, for example.

In the formation of a damped drive shaft one produces the hollow tube 2 having a uniform wall thickness and a bore 6 of substantially uniform diameter from end to end. The length of the tube 2 will correspond to that desired. Following formation of the tube 2 the damper 9 of desired length is inserted into the tube from one end thereof so as to occupy a position equidistant from each end and in snug engagement with the surface of the bore.

Following placement of the damper within the tube 2 a plug 13 is fitted into each end of the tube. Each plug is spaced inward from the adjacent end of the tube and terminates short if the adjacent end of the damper. Each plug 13 comprises a cylindrical body 14 formed of suitable resilient, waterproof material, such as closed cell urethane, which is form-stable, but deformable in response to the imposition thereon of radially compressive force. Each body 14 has an undeformed diameter corresponding substantially to the diameter of the bore 6 of the tube 2. Each body also has an axial bore 15 therein through which extends an elongate rod or bolt 16 having an eye 17 at one end and a washer 18 at its opposite end.

Following the fitting of the plugs 13 into opposite ends of the tube 2 the ends of the latter are subjected to a swaging operation of known kind which radially contracts the ends and produces the reduced diameter ends 3 and 4. As the ends of the tube are reduced in diameter, the contracting bores 7 and 8 apply a radially compressive force on the plugs 13 causing them simultaneously to be deformed both radially and axially. The plugs thus will have a deformed diametral dimension such as to form a seal at each end of the tube 2. The lengths of the damper and the plugs, and the initial position of the plugs in the tube, are such that the plugs do not engage the ends of the damper during the axial deformation of the plugs.

Following the swaging of the ends of the tube the free ends of the reduced diameter parts 3 and 4 may be finished or faced by a cutting tool T to provide end surfaces which are normal to the longitudinal axis of the tube and, if desired, such end surfaces may be chamfered. Thereafter, the tube may be washed to remove swaging and cutting fluids. The seal effected by the plugs prevents liquids, as well as chips from the facing and chamfering operations, from entering the larger diameter section of the tube where the damper is located.

Following the washing operation hooks 19 and 20 may be inserted in the eyes 11 of the plugs 13 to facilitate removal of the plugs from opposite ends of the tube. After the plugs have been removed the shaft containing the damper may be balanced and processed for the attachment of universal joints or other devices.

Figure 8:
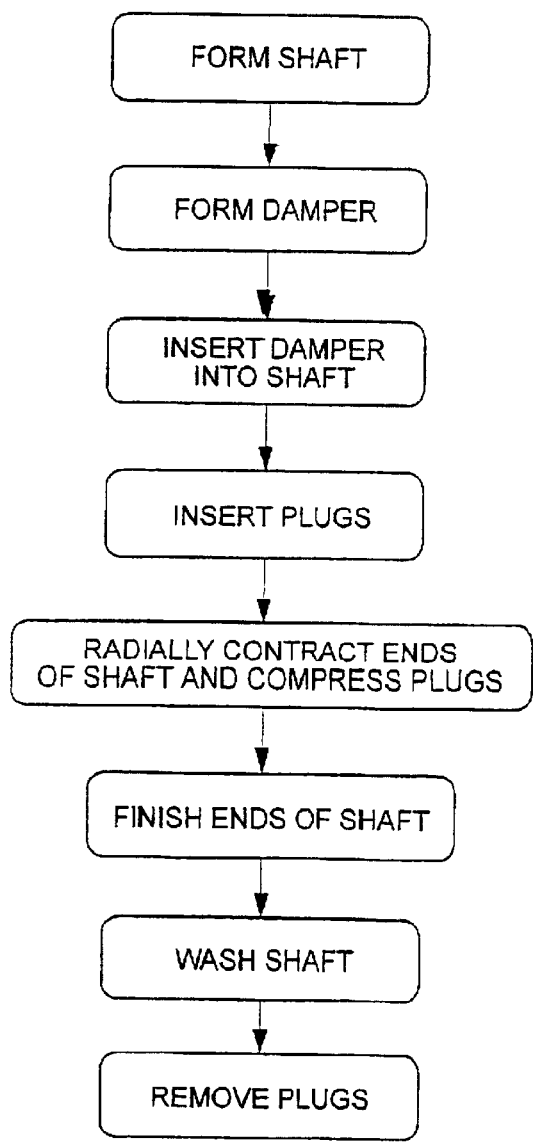
FIG. 8 is a flow diagram illustrating the several steps of producing the damped shaft.
Figure 9:
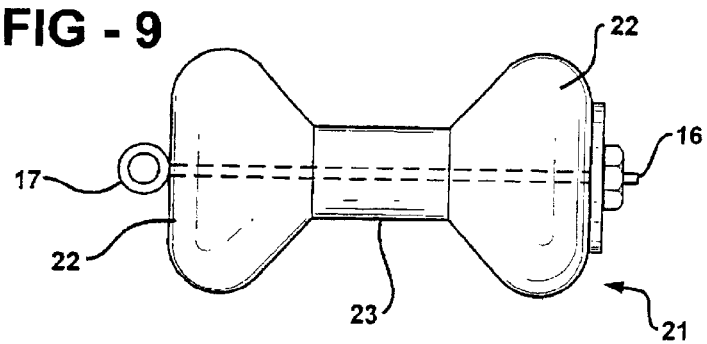
FIGS. 9–12 are elevational views of examples of other plugs which may be used.

The procedural steps for forming a damped shaft having reduced diameter ends are illustrated in the flow chart of FIG. 8.

Alternative forms of plugs are shown in FIGS. 9–12. The plug 21 of FIG. 9 has enlarged, cylindrical ends 22 spaced by a reduced diameter neck 22. The spacing between the ends 22 is sufficient to ensure axial stability of the plug in the tube 2. The external surfaces of the ends 22 preferably are convexly rounded for the purpose of ensuring a seal and, at the same time, preventing excessive friction in opposition to extraction of the plugs following contraction of the tube's ends.

Figure 10:
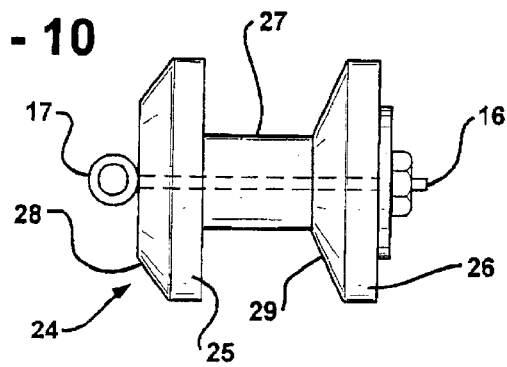

The plug 24 shown in FIG. 10 is similar to the plug 21 in that it has cylindrical enlargements 25 and 26 spaced by a neck 27. The periphery of each enlargement is flat, but corresponding sides thereof are tapered, as shown at 28 and 29. The tapered surfaces should face the adjacent open end of the tube 2 when the plug is inserted therein so as to facilitate extraction of the plug from the tube following the reduction in diameter of its ends.

Figure 11:
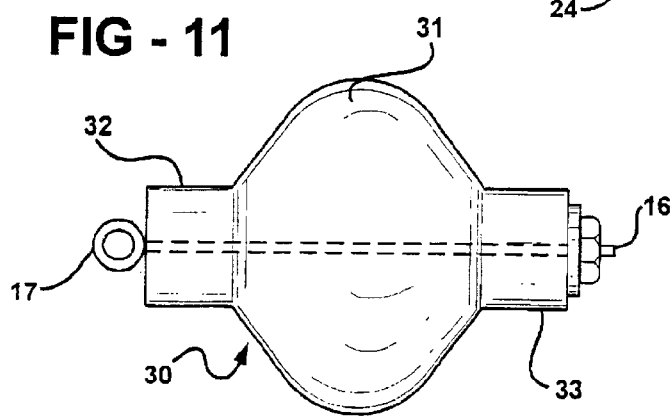

The plug 30 shown in FIG. 11 has an enlarged center section 31 flanked by reduced diameter, cylindrical extensions 32 and 33. The surface of the section 31 preferably is convexly rounded for the purpose of facilitating extraction of the plug from the tube.

Figure 12:
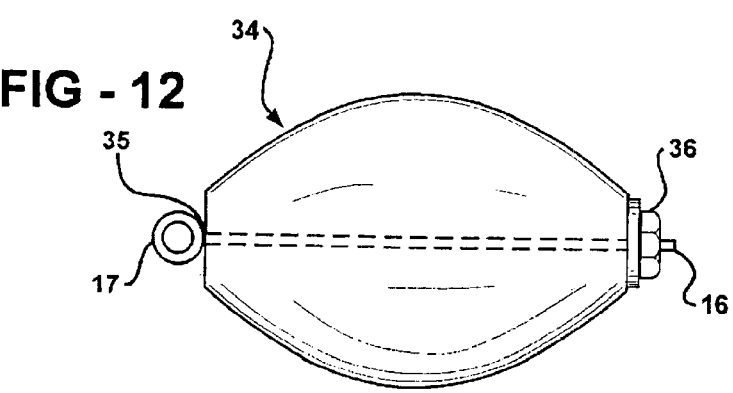

The plug 34 shown in FIG. 12 is in the form of an oblate spheroid and is similar in shape to that of a football, although the terminal ends 35 and 36 of the plug preferably are flat. The maximum diameter of the plug is at its center, thereby facilitating extraction of the plug from the tube.

This disclosure is representative of a presently preferred method according to the invention, but is intended to be illustrative rather than definitive thereof. The invention is defined in the claims.

We claim:

1. A method of producing a damped cylindrical shaft from a tube having between its opposite ends a bore of selected diameter, said method comprising inserting into said bore from one end of said tube a cylindrical damper having a diameter corresponding substantially to that of said bore, said damper being shorter in length than that of said bore and said damper occupying a position in said bore inward from the opposite ends of said tube; inserting into said bore at each end of said tube a plug formed of resilient, deformable material; radially contracting the opposite ends of said tube to a diameter less than that of said damper and less than that of said plugs, thereby deforming radially inwardly each of said plugs to a diametral dimension in which said plugs seal the opposite ends of said tube; and removing said plugs following the radial contraction of the opposite ends of said tube.

2. The method according to claim 1 wherein the opposite ends of said tube are contracted by swaging.

3. The method according to claim 1 including finishing the opposite ends of said tube.

4. The method according to claim 3 wherein the finishing of the opposite ends of said tube precedes the removal of said plugs.

5. The method according to claim 3 wherein the finishing of the opposite ends of said tube includes facing said opposite ends.

6. The method according to claim 3 wherein the finishing of the opposite ends of said tube includes chamfering the opposite ends of said tube.

7. The method according to claim 1 wherein each of said plugs is formed of closed cell foam material.

8. The method according to claim 1 wherein each of said plugs is cylindrical when undeformed.

9. The method according to claim 1 wherein each of said plugs when undeformed has enlargements spaced by a neck.

10. The method according to claim 9 wherein when undeformed each said enlargement has a convexly rounded surface.

11. The method according to claim 9 wherein each said enlargement when undeformed has a tapered surface.

12. The method according to claim 1 wherein each said plug when undeformed has an enlargement between opposite ends of said plug.

13. The method according to claim 1 wherein each said plug when undeformed has a substantially oblate spheroid configuration.

14. The method according to claim 13 wherein said plug has flat opposite ends.

* * * * *